United States Patent Office 3,267,132
Patented August 16, 1966

3,267,132
NITROSO COMPOUNDS AS INHIBITORS OF POLYMERIZATION OF UNSATURATED NITRILES
Raymond A. Newsom, Dickinson, Tex., assignor to Monsanto Company, St. Louis, Mo., a corporation of Delaware
No Drawing. Filed June 22, 1964, Ser. No. 377,059
8 Claims. (Cl. 260—465.9)

This invention relates to the stabilization of unsaturated nitriles. More particularly, it relates to the inhibition of polymerization of α,β-unsaturated nitriles and, even more specifically, to the inhibition of polymerization of acrylonitrile.

The unsaturated nitriles, particularly the α,β-unsaturated nitriles such as acrylonitrile are extremely useful chemical compounds. Considerable quantities of these materials are used for the preparation of synthetic rubbers and various types of synthetic resins. These compounds, however, possess a characteristic which all too frequently hampers not only their utility but also creates difficulties in the purification techniques commonly employed in their preparation. All of these compounds exhibit a tendency to polymerize when exposed to air, light and/or elevated temperatures for short periods of time. Such polymerization results in discoloration of the unsaturated nitrile monomer and ultimately in the formation of solid polymer contaminant.

Since most applications or uses of the unsaturated nitriles require high-purity products, these polymerization characteristics present a serious problem in the preparation, handling and storage of the finished grade monomers. Furthermore, since distillation at elevated temperatures is the commonly used purification technique, the purification process is seriously hampered by the formation of solid polymer which accumulates in the equipment ultimately plugging the system. This problem is also aggravated by the fact that impurities present in the crude unsaturated nitriles are frequently compounds of the type which accelerate polymerization even when present in only very minor amounts.

In order to overcome the difficulties encountered, it is essential to prevent premature polymerization and for this purpose it is common practice to add an inhibiting agent to the liquid monomer. A number of substances have been proposed for addition to the nitriles to retard or prevent polymerization. In general, however, the inhibitors or stabilizers which have been used have not proven to be completely satisfactory.

It is, therefore, an object of this invention to provide a new class of polymerization inhibitors for unsaturated nitriles in general and for acrylonitrile, in particular.

It is another object of the invention to provide an improved method for preventing the polymerization of unsaturated nitriles by the addition of a certain class of inhibitors which do not possess deficiencies and disadvantages exhibited by inhibitors or stabilizers of the prior art.

A still further object of the invention is to provide novel stabilized compositions comprising an unsaturated nitrile and an added polymerization inhibitor which can be subjected to extended periods of storage or distillation at elevated temperatures without exhibiting any significant evidence of polymer formation.

Further objects and advantages of the invention will become apparent from the following description thereof.

It has now been discovered that the polymerization of unsaturated nitriles, particularly α,β-unsaturated nitriles such as acrylonitrile, can be greatly inhibited by incorporating therein a minor amount of a nitroso compound selected from the group consisting of p-nitrosodiarylamines and N-nitrosoarylamines. In accordance with the invention, a composition comprising an unsaturated nitrile and a minor amount of a p-nitrosodiarylamine or an N-nitrosoarylamine will not exhibit any significant polymer formation on prolonged periods of storage at normal temperatures or when subjected to the temperatures commonly employed in purifying such crude nitriles by distillation techniques. Typical examples of particular nitroso compounds which can be used in the practice of the invention comprise the following: p-nitrosodiphenylamine, p-nitrosoditolylamine, N-nitrosobenzylaniline, N-nitrosodihydrotrimethylquinoline, N - nitrosodihydrotrimethylquinoline polymer, N-nitrosodi-β-naphthylamine, N - nitrosodiphenylamine, N - nitrosophenothiazine, N-nitroso - 6 - phenyldihydrotrimethylquinoline, N-nitrosophenyl-β-naphthylamine, and the like.

The amount of the nitroso compound used to inhibit polymerization can be varied widely depending upon the particular nitrile to be stabilized and the degree of inhibition desired. In general, only minor amounts are employed. In fact, an advantage of the new inhibitors here disclosed is that they can be used very effectively in extremely small quantities. While concentrations anywhere in the range from about 0.001% to about 5% by weight of the nitrile can be used, preferred concentrations are those in the range from about 10 to about 1000 parts of inhibitor per million parts of the nitrile. These low concentrations even afford adequate stability during distillation of the crude nitriles and greatly simplify subsequent processing of the nitrile.

The inhibitors of the invention can be used to stabilize unsaturated nitriles under many different types of conditions. Thus, they can be used to inhibit polymer formation in unsaturated nitriles during storage under atmospheric conditions of light, air, temperature and pressure as well as during purification of the crude nitrile. To inhibit polymer formation during distillation of the unsaturated nitrile, the inhibitor can either be added to any of the various streams introduced into the column such as to the feed stream or to the reflux stream, or introduced separately at some point in the distillation column. Preferably, the inhibitor is introduced at the top of the column in the reflux stream to provide maximum inhibition throughout the entire system.

The unsaturated nitriles which respond readily to the stabilizing effect of the inhibitors disclosed herein are α,β-unsaturated nitriles of the formula

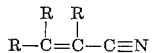

wherein the R's are the same or different and are selected from the group consisting of hydrogen, the halogens, and hydrocarbon radicals containing 1 to 18 carbon atoms. The hydrocarbon radicals may be cyclic or acyclic, saturated, unsaturated or aromatic such as the alkyl, alkenyl, aryl, alkaryl, alkenaryl, aralkyl, aralkenyl, cycloalkyl and cycloalkenyl radicals. Examples of such hydrocarbon radicals are methyl, ethyl, propyl, isopropyl, n-butyl, isobutyl, tert-butyl, hexyl, n-octyl, trimethyldecyl, allyl, methallyl, vinyl, carbinyl, pentenyl, hexenyl, phenyl, diphenyl, naphthyl, anthryl, tolyl, dipropylnaphthyl, cyclohexenyl, trimethylcyclohexyl, cyclopentenyl, and the like. Acrylonitrile, α-substituted acrylonitriles wherein the substituent on the α-carbon atom is an alkyl radical containing from 1 to 8 carbon atoms and β-substituted acrylonitriles wherein the substituent on the β-carbon atom is an alkyl radical containing from 1 to 8 carbon atoms represent a class of monomers which polymerize very readily but which can be most effectively inhibited against polymerization by means of nitroso compounds according to the process of the present invention. Specific examples of nitriles included in the classes described, in addition to acrylonitrile already mentioned, are methacrylonitrile, crotononitrile, α-ethylacrylonitrile, β-hexylacrylonitrile, α,β-dimethylacrylonitrile, β-butylacrylonitrile, α-chloroacrylonitrile, β-ethylacrylonitrile, α-naphthylacrylonitrile, β-cyclohexenylacrylonitrile, α-phenylacrylonitrile, and α-pentenylacrylonitrile.

The invention is illustrated in the following examples which, however, are not to be construed as limiting it in any manner whatsoever.

EXAMPLE 1

A series of polymerization tests were conducted on crude acrylonitrile free of inhibitor, a crude acrylonitrile containing 100 p.p.m. of p-aminophenol, a known inhibitor of polymerization for α,β-unsaturated nitriles, and crude acrylonitrile containing varying amounts of p-nitrosodiphenylamine.. The crude acrylonitrile samples had compositions within the following approximate ranges expressed in weight percent: acrylonitrile, 89 to 93%; lactonitrile, 3.6 to 7.3%; acetonitrile, 0.05 to 0.1%; crotononitrile, 0.4 to 0.6%; acetaldehyde, 0.2 to 0.3%; crotonaldehyde, 0.2 to 0.4%; methyl vinyl ketone, 0.1%; acetone, 0.01 to 0.02%; cyanobutadiene, 2.1 to 3.5%. An 85-ml. sample of the acrylonitrile to be tested was charged to a 100-ml. round-bottomed flask fitted with a heating mantle, heated rapidly to reflux temperature and maintained under reflux conditions at atmospheric pressure. The heating mantles were lowered at regular intervals and the flasks were examined with a flashlight to detect turbidity or cloudiness of the solution, a condition indicative of polymerization since the polymer is insoluble in the monomer. The period of time from the beginning of refluxing to the appearance of turbidity or polymer particles in the solution was recorded and termed the induction period. Data obtained on all the samples are presented in Table 1. These data conclusively demonstrate that p-nitrosodiphenylamine not only is an excellent inhibitor of polymerization for crude acrylonitrile but that under the elevated temperature conditions required for refluxing acrylonitrile and even in the presence of impurities known to be accelerators of polymerization, it is considerably more effective than p-aminophenol, the prior art inhibitor.

*Table 1*

| Run No. | Induction Period (Minutes) | | | Conc. PNDA (p.p.m.) |
|---|---|---|---|---|
| | No Inhibitor | 100 p.p.m. p-Aminophenol | p-Nitrosodiphenylamine (PNDA) | |
| 1 | <5 | 25-30 | >420 | 100 |
| 2 | 5-10 | 5-10 | >420 | 100 |
| 3 | 5-10 | 5-10 | 300-460 | 50 |
| 4 | 5-10 | 5-10 | 140-170 | 50 |
| 5 | 5-10 | 5-10 | 95-125 | 100 |
| 6 | 0-5 | 0-5 | 85-115 | 100 |
| 7 | 20-25 | 30-40 | >420 | 100 |
| 8 | 5-10 | 65-80 | 215-245 | 100 |
| 9 | 5-20 | 35-50 | >230 | 50 |
| 10 | 5-10 | 10-15 | 115-150 | 10 |
| 11 | 0-5 | 10-15 | >350 | 100 |
| 12 | 5-10 | 10-15 | >420 | 10 |
| 13 | 0-5 | 0-5 | 15-50 | 12 |
| 14 | 0-5 | 0-5 | 65-105 | 100 |

EXAMPLE 2

The tests described in Example 1 were repeated except that 100 p.p.m. of N-nitrosodiphenylamine was substituted for the p-nitrosodiphenylamine used in that example. The induction period with this inhibitor present was 120-195 minutes as compared to one of 5-10 minutes for the uninhibited crude acrylonitrile and for the crude acrylonitrile containing 100 p.p.m. of p-aminophenol.

EXAMPLE 3

Another series of polymerization tests were conducted in the manner of Example 1 using samples of substantially pure acrylonitrile containing no inhibitor, 100 p.p.m. of hydroquinone, 100 p.p.m. of hydroquinone monomethyl ether, and 100 p.p.m. of p-nitrosodiphenylamine, respectively. The induction period was less than 5 minutes for both the uninhibited acrylonitrile and for that containing hydroquinone; with hydroquinone monomethyl ether in the acrylonitrile, the induction period was from 5 to 10 minutes whereas with p-nitrosodiphenylamine present no polymerization of the acrylonitrile was evident after 96 hours of refluxing. These tests demonstrate that p-nitrosodiphenylamine not only effectively inhibits the polymerization of pure acrylonitrile under drastic temperature conditions but conclusively establish that this nitroso compound is exceedingly more effective as an inhibitor than either hydroquinone or the monomethyl ether of hydroquinone, both of which are recognized among the more effective of the inhibitors in the prior art.

What is claimed is:

1. A composition consisting essentially of an unsaturated nitrile of the formula

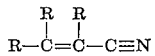

wherein R is selected from the group consisting of hydrogen, chlorine and hydrocarbon radicals having from 1 to 8 carbon atoms, said nitrile containing a nitroso compound selected from the group consisting of p-nitrosodiphenylamine and N-nitrosodiphenylamine and in an amount sufficient to inhibit polymerization.

2. The composition of claim 1 wherein the amount of said nitroso compound is from about 0.001% to about 5% by weight of said nitrile.

3. A composition consisting essentially of acrylonitrile containing p-nitrosodiphenylamine in an amount sufficient to inhibit polymerization.

4. A composition consisting essentially of acrylonitrile containing N-nitrosodiphenylamine in an amount sufficient to inhibit polymerization.

5. A process for inhibiting the polymerization during distillation of an unsaturated nitrile of the formula

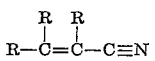

wherein R is selected from the group consisting of hydrogen, chlorine and hydrocarbon radicals having from 1 to 8 carbon atoms which consists essentially of distilling said nitrile in the presence of a compound selected from the group consisting of p-nitrosodiphenylamine and N-nitrosodiphenylamine in an amount sufficient to inhibit polymerization.

6. The process of claim 5 wherein the amount of said nitroso compound is from about 0.001 to about 5% by weight of said nitrile.

7. A process of inhibiting the polymerization of acrylonitrile during distillation which consists essentially of distilling said acrylonitrile in the presence of p-nitrosodiphenylamine in an amount from about 0.001% to about 5% by weight of said acrylonitrile.

8. A process for inhibiting the polymerization of acrylonitrile during distillation which consists essentially of distilling said nitrile in the presence of N-nitrosodiphenylamine in an amount from about 0.001% to about 5% by weight of said acrylonitrile.

References Cited by the Examiner

UNITED STATES PATENTS 2,402,806   6/1946   Durland _____ 260—666.5

CHARLES B. PARKER, *Primary Examiner.*

JOSEPH P. BRUST, *Assistant Examiner.*